United States Patent [19]

Osborne

[11] Patent Number: 5,038,574
[45] Date of Patent: Aug. 13, 1991

[54] COMBINED MECHANICAL REFRIGERATION AND ABSORPTION REFRIGERATION METHOD AND APPARATUS

[75] Inventor: William T. Osborne, Severn, Md.

[73] Assignee: Baltimore Aircoil Company, Inc., Jessup, Md.

[21] Appl. No.: 604,577

[22] Filed: Oct. 26, 1990

Related U.S. Application Data

[63] Continuation-in-part of Ser. No. 351,067, May 12, 1989, Pat. No. 4,966,007.

[51] Int. Cl.⁵ ............................................. F25B 15/00
[52] U.S. Cl. ...................................... 62/101; 62/335; 62/488; 62/476
[58] Field of Search ............... 62/101, 335, 476, 488, 62/332, 333

[56] References Cited

U.S. PATENT DOCUMENTS

| 3,138,938 | 6/1964 | Beardslee | 62/488 |
|---|---|---|---|
| 3,320,760 | 5/1967 | Swearingen | 62/476 |
| 3,360,950 | 1/1968 | Osborne | 62/476 |
| 3,563,304 | 2/1971 | McGrath | 165/29 |
| 3,651,655 | 3/1972 | Dyre | 62/476 |
| 3,701,265 | 10/1972 | Leonard, Jr. | 62/476 |
| 3,742,726 | 7/1973 | English | 62/476 |
| 3,742,727 | 7/1973 | Kaiser | 62/476 |
| 3,745,780 | 7/1978 | Leonard, Jr. | 62/141 |
| 3,824,804 | 7/1974 | Sandmark | 62/238.3 |
| 4,085,596 | 4/1978 | Miyamoto et al. | 62/476 |
| 4,100,755 | 7/1978 | Leonard | 62/476 |
| 4,246,762 | 1/1981 | Bourne | 62/476 |
| 4,269,041 | 5/1981 | Holldorff | 62/476 |
| 4,337,625 | 7/1982 | Wilkinson | 62/476 |
| 4,448,040 | 5/1984 | Kunugi | 62/238.3 |
| 4,471,630 | 9/1984 | Sugimoto | 62/476 |
| 4,513,584 | 4/1985 | Woyke | 62/476 |
| 4,724,679 | 2/1988 | Radermacker | 62/101 |
| 4,823,864 | 4/1989 | Rockenfeller | 62/477 |

Primary Examiner—Albert J. Makay
Assistant Examiner—John Sollecito
Attorney, Agent, or Firm—Edward J. Brosius; Florian S. Gregorczyk

[57] ABSTRACT

A method and apparatus combining absorption refrigeration and mechanical expansion refrigeration to chill an air conditioning medium wherein a mechanical refrigeration system is alternately (1) connected in series with an absorption refrigeration system during a cooling cycle to cool an external air conditioning medium, and (2) connected to drive the absorption system during a storage cycle to concentrate and store a strong internal liquid absorbent solution and to store an internal diluent refrigeration liquid which liquids are utilized during the cooling cycle.

14 Claims, 5 Drawing Sheets

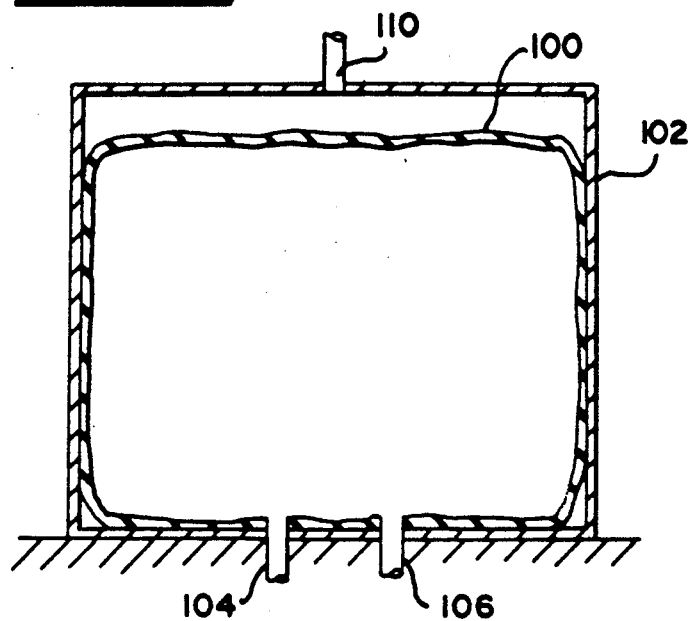
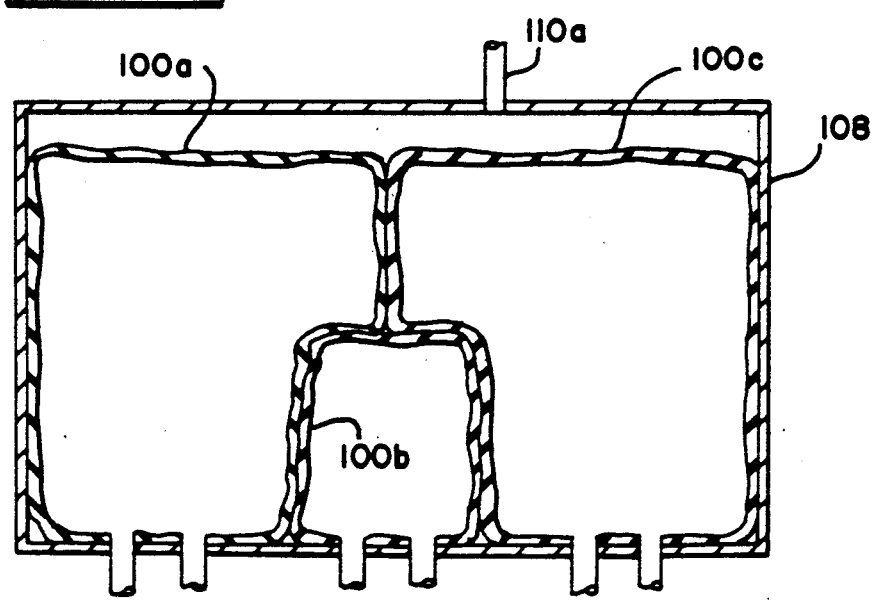

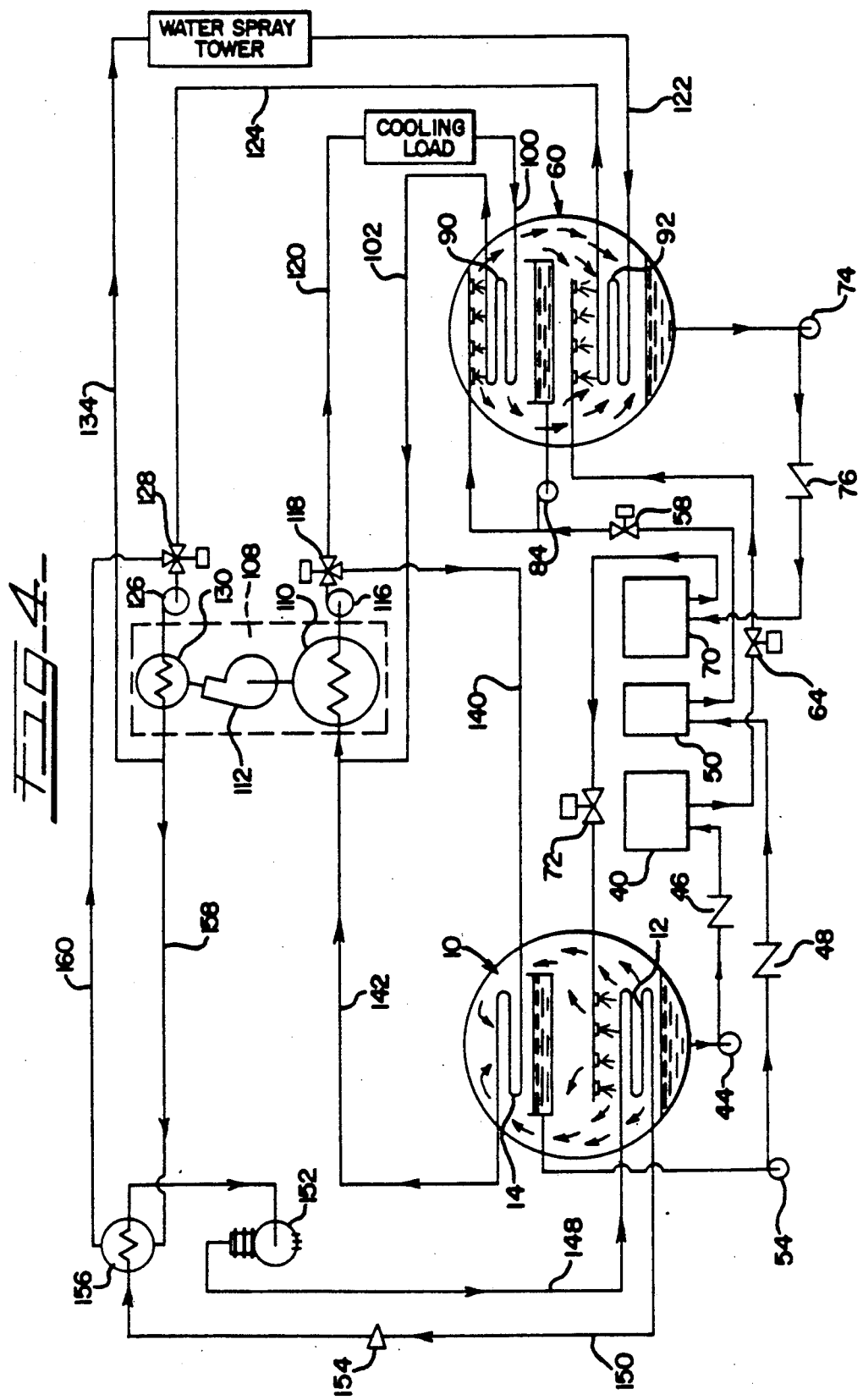

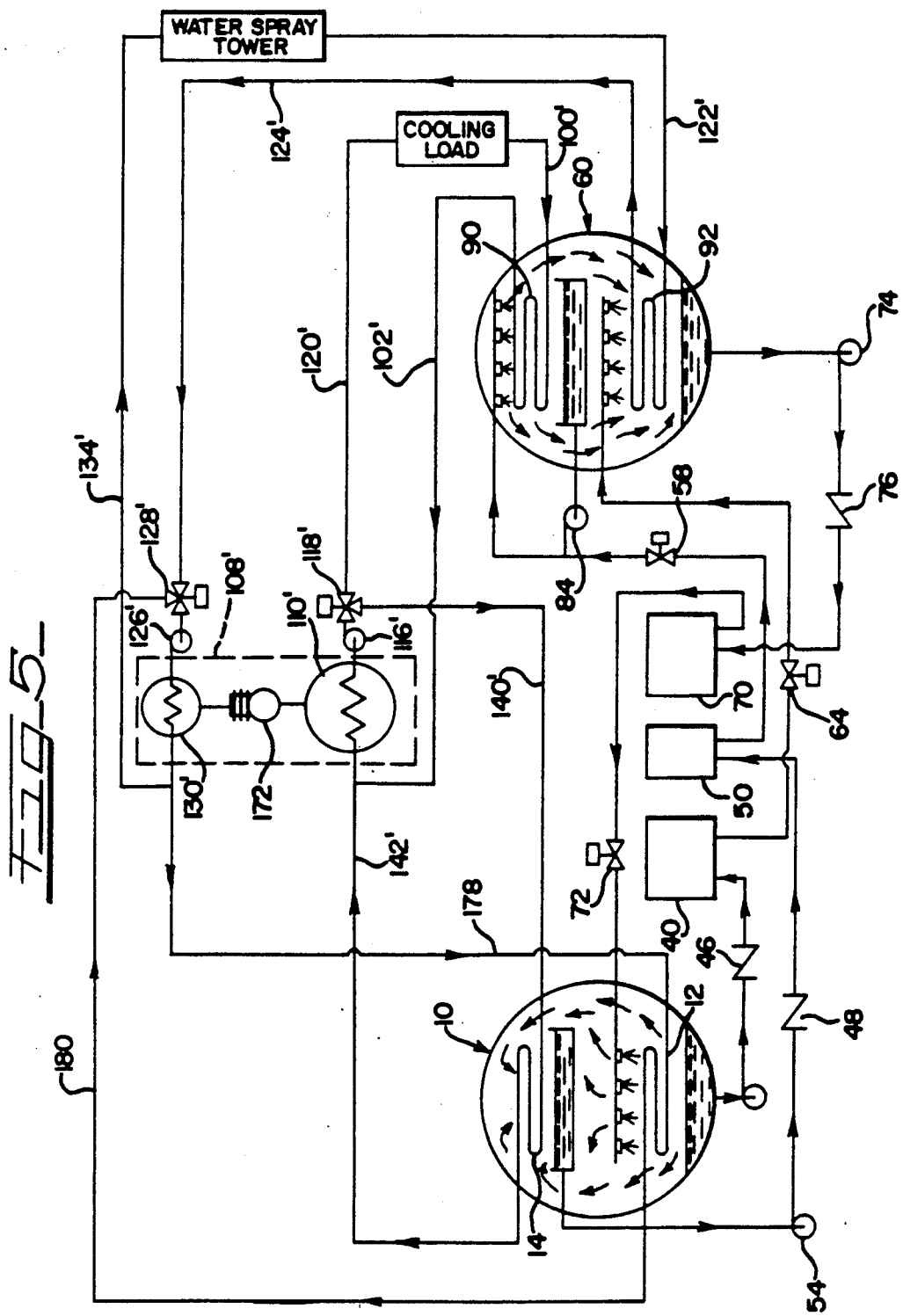

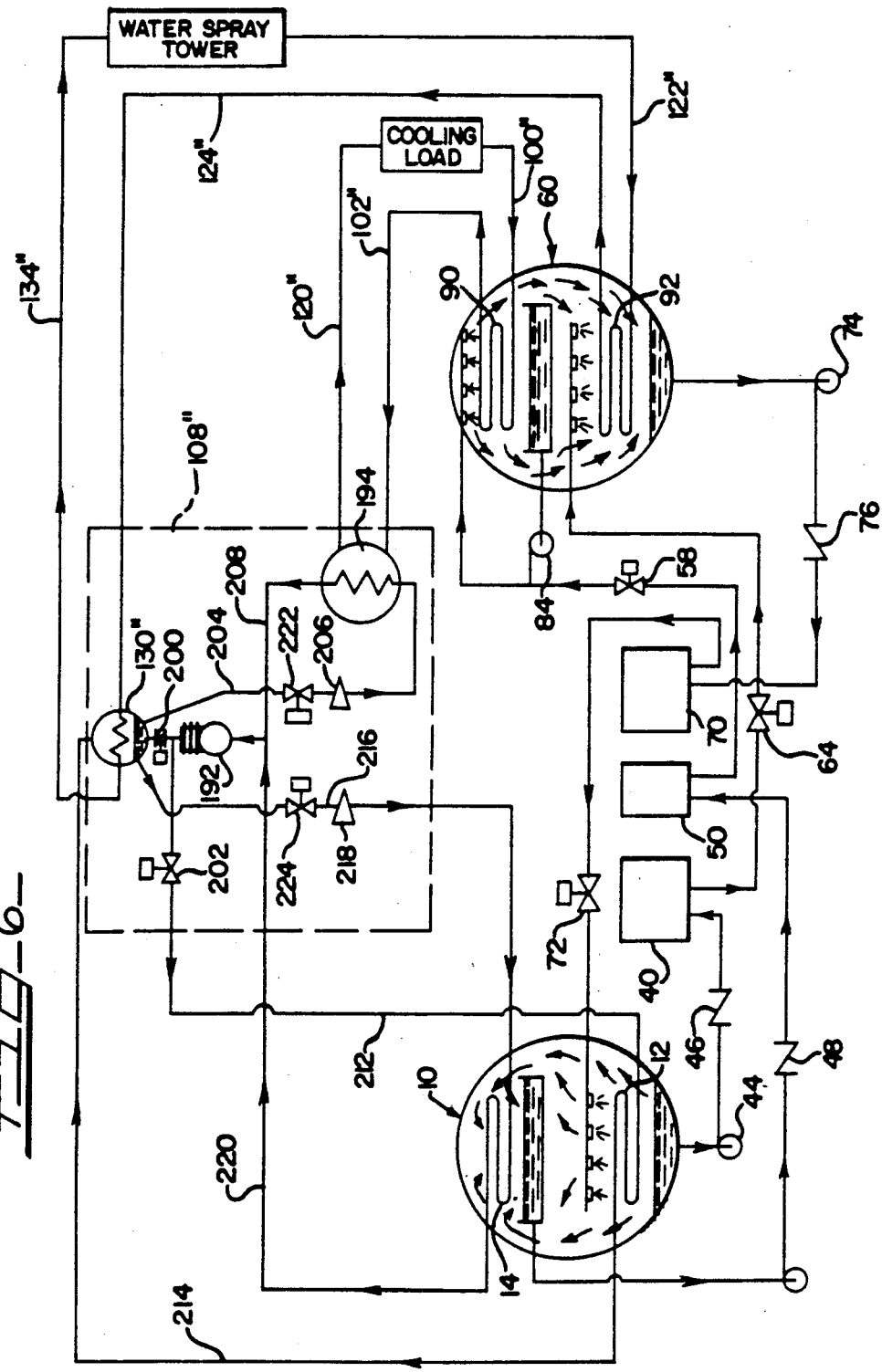

5,038,574

COMBINED MECHANICAL REFRIGERATION AND ABSORPTION REFRIGERATION METHOD AND APPARATUS

BACKGROUND OF THE INVENTION

This patent application is a continuation-in-part of my prior co-pending application Ser. No. 07/351,067 filed May 12, 1989, now U.S. Pat. No. 4,966,007.

The present invention relates to refrigeration and more specifically deals with an improved method and apparatus combining an absorption refrigeration system with a mechanical refrigeration system to supplement chilling capacity and to store thermal energy.

Absorption refrigeration systems, which are driven by heat energy, have been long known and indeed predate mechanical expansion refrigeration; but the latter has become more prevalent in existing installations due to abundant and inexpensive electrical energy and the discovery and commercial production of fluorinated hydrocarbon refrigerant gases. However, increasing costs for electrical energy, especially during high demand portions of a calendar day, and environmental concerns associated with fluorinated hydrocarbons are creating opportunities for absorption refrigeration. The term "absorption" herein is to be interpreted broadly so as to embrace both absorption and adsorption phenomena.

In an absorption refrigeration cycle a liquid solution, such as lithium bromide in water, is concentrated in a first phase by heating to drive off a portion of a diluent component (water) and the concentrated solution is delivered to a second absorber phase where it absorbs or reabsorbs that component so as to become diluted. Thus, the diluent component (such as water) is available between phases to take up heat removed from a load (such as refrigerated or cooled space) so as to produce a diluent vapor and that vapor is then absorbed by the concentrated solution which, upon becoming diluted is returned to the first phase to be reconcentrated.

Heretofore absorption refrigeration systems have been regarded as potential alternates in place of mechanical expansion refrigeration systems, but the former are relatively inefficient and inflexible because they have largely relied on the refrigeration effect of an evaporable absorption component and the requisite heat energy has been supplied either by unreliable waste heat or by a burning flame of expensive fuels; and the respective concentrator and absorber phases have not been adaptable to intermediate storage whereby the concentrator phase could be disassociated, timewise, from the absorber phase. However, in U.S. Pat. No. 4,269,041 to Gunther Holldorff, there is described an ammonia absorption refrigeration system with time separation facilitated by storage of the absorption fluids, and my co-pending patent application Ser. No. 07/351,067 deals with storing absorption fluids separate from the concentrator and absorber vessels. It would be significant if the advantages of each of the absorption and mechanical types of refrigeration systems could be obtained; and also if existing mechanical refrigeration installations could be modified to obtain some of the advantages of an absorption refrigeration system.

SUMMARY OF THE INVENTION

Accordingly, it is a principal object of the present invention to provide a combined refrigeration method and apparatus of improved efficiency.

It is another object of the present invention to provide an absorption refrigeration method and apparatus combined with a mechanical expansion refrigeration system so as to indirectly utilize electrical energy as a power source for the absorption system.

It is still another object of the present invention to provide an absorption refrigeration method and apparatus which are energized by a mechanical refrigeration system.

It is still another object of the present invention to provide an absorption refrigeration method and apparatus which are energized by a mechanical refrigeration system to produce and store quantities of a strong absorbent solution and a cold liquid diluent during the concentrator phase for subsequent use when the absorber phase is used to supplement the cooling capacity of the mechanical refrigeration system.

Briefly stated the present invention involves the combination of an absorption refrigeration system with a mechanical expansion refrigeration system and the addition of adequate storage for both concentrated and diluted liquid absorbent solutions and cold liquid diluent so as to enable the concentrator phase and the evaporator phase of the absorption system to be operable at dissimilar rates and/or time periods and thereby be available to supplement the cooling capacity of the mechanical system during peak demand. The absorption system is sized to provide approximately one-half of the cooling capacity needed to serve the air conditioning load and the evaporator phase output is connected, preferably in series, with the mechanical system during the cooling cycle (usually during a workday) and the concentrator phase is connected with the mechanical system during a storage cycle (usually during night time when electrical energy costs are relatively low). Preferably both concentrator and evaporator phases of the absorption system are operated at relatively equal pressure whereby the diluent saturation temperatures are substantially equal and temperature variation of the absorbent solution between phases is minimized. Thermodynamically, this equalization increases the efficiency of the absorption system and eliminates the need for a costly and troublesome liquid solution heat interchanger as has heretofore been used with conventional absorption systems. Additionally, the equalization which this invention makes possible works to minimize the solution concentrations and temperatures, a combination which will reduce the corrosive characteristics of the absorbent solution.

BRIEF DESCRIPTION OF THE DRAWINGS

Further objects and advantages of the present invention will become apparent upon reading the following detailed description in conjunction with the drawings wherein:

FIG. 2 is a side elevation of a vessel and single reservoir for the system of FIG. 1;

FIG. 3 is a side elevation of an alternative embodiment of multiple reservoirs within a single vessel;

FIG. 4 is a line drawing of an embodiment of the present invention for retrofitting an installation having a mechanical refrigeration system and a centrifugal compressor;

FIG. 5 is a line drawing of an embodiment of the present invention for retrofitting an installation having a mechanical refrigeration system and a reciprocating compressor; and FIG. 6 is a line drawing of an embodiment of the present invention for new installation combining an absorption refrigeration system with a mechanical refrigeration system, involving reciprocating compressor and a direct expansion cooler.

DETAILED DESCRIPTION

Figure 1:
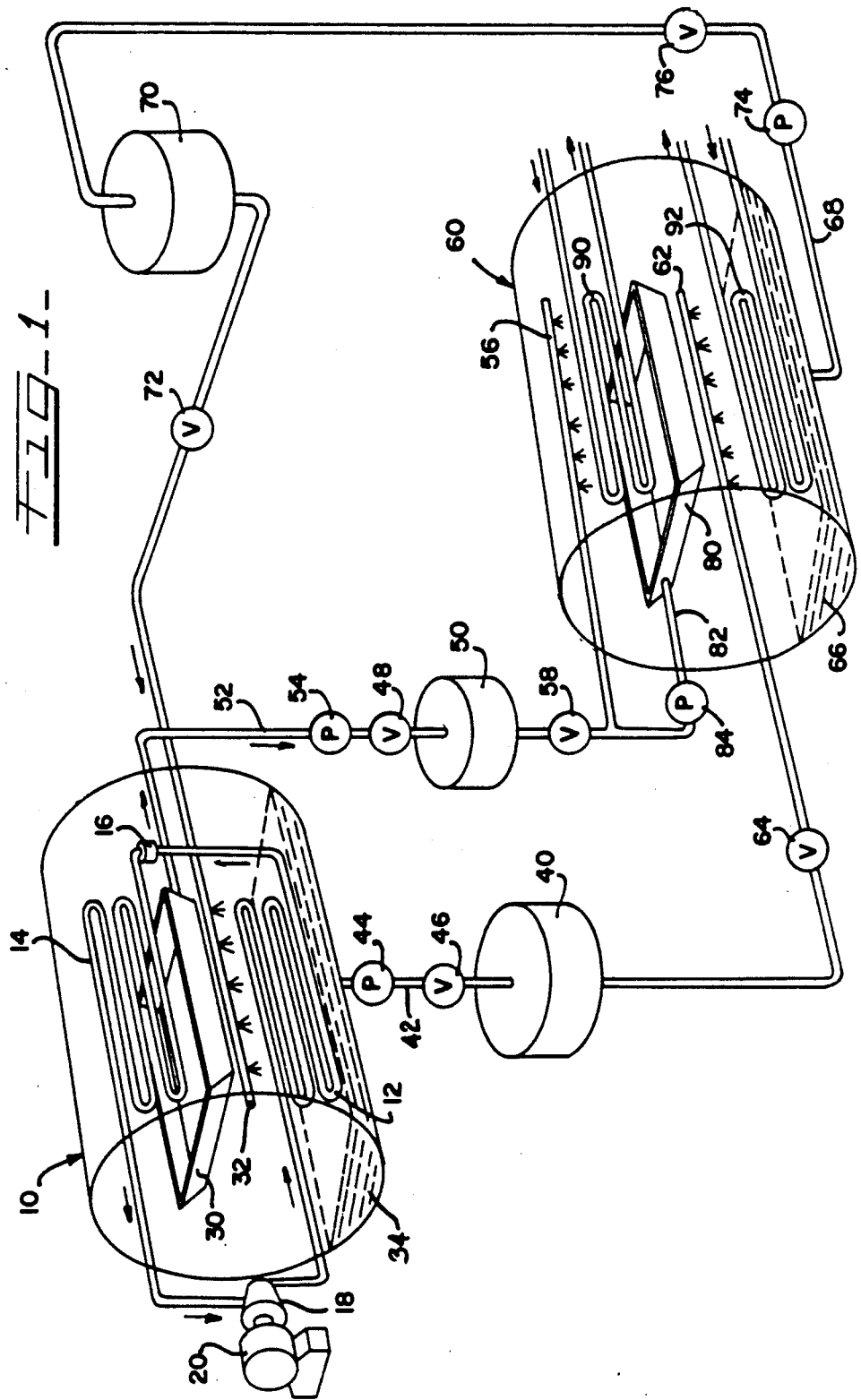
FIG. 1 is a schematic drawing of an embodiment of an independently operable absorption refrigeration system wherein three liquid reservoirs are interconnected between an absorption refrigeration concentrator vessel and evaporator/absorber vessel and wherein a heat pump drives the concentrator.

It is to be understood that in the illustrated apparatus of FIG. 1, described hereafter, certain functional parts of absorption refrigeration equipment commonly referred to as generator, condenser, absorber and evaporator are located among two vessels 10, 60 wherein the illustrated concentrator vessel 10 includes a lower generator section and an upper condenser section; and the illustrated evaporator vessel 60 includes a lower absorber section and an upper evaporator section.

As further background to the present method, absorption refrigeration involves the steps of concentrating an absorption refrigerant liquid solution, such as an aqueous solution of lithium bromide, by heating a first internal liquid stream of a relatively weak or diluted solution within a first concentrator phase containing generator and condenser functions to distill a diluent vapor (generator function) and therein condensing (condenser function) the vapor by cooling, thereby producing internal liquid streams of relatively concentrated or strong absorbent solution (in the generator) and cold diluent (in the condenser). Both of these liquid streams are utilized in a second evaporator phase where the cold liquid diluent is used for chilling an external refrigeration medium that is circulated to a cooling load. Aqueous solutions of lithium bromide are preferred because of favorable cost and environmental considerations, such as low toxicity. However, it will be understood that other diluent/absorbent pairs are known to satisfactorily perform in absorption refrigeration systems such as ammonia/water, water/sodium hydroxide, and water/calcium hydroxide, and may be used in the present method and apparatus.

It is notable that in absorption refrigeration systems the input energy to drive the system is in the form of thermal units, that is heating and cooling. Thus absorption refrigeration tends to be an economical choice where sources of heat and cold are relatively inexpensive. On the other hand mechanical expansion refrigeration systems which provide cooling through the vaporization of an internal refrigerant gas also involve compression of the gas and the extraction of the heat of condensation and the heat of compression before the expansion and vaporization cycle; and compression requires either a reciprocating or a centrifugal compressor which must be energized by motive power, from a motor or engine. Thus mechanical refrigeration tends to be the more economical choice where motors and engines and fuels to run them, especially electricity, are plentiful and relatively inexpensive. Furthermore, both systems produce relatively hot and relatively cold external or output media, the hot media normally being circulated to a heat ejector (such as a cooling tower), and the cold media normally being circulated to an air conditioning or other cooling load. The usual mechanical systems depend on essentially continuous flow of the expandable refrigerant gas during load cycles and do not lend themselves to safe direct storage of cold thermal energy; whereas it has been found that an absorption system can be designed to directly store cold thermal energy by providing for the accumulation of excess quantities of internal strong absorbent solution and internal diluent liquid produced in the concentrator phase.

As is well known, the typical mechanical system comprises a closed fluid circuit with a compressor, either reciprocable or centrifugal, which compresses a refrigerant gas, a heat extractor to discharge heats of condensation and compression and a vaporizing section where the fluid boils at low temperature to consume heat. It has also now been found that mechanical and absorption systems may be combined so as to process a common or single external cold medium during a chilling or air conditioning cycle and the mechanical system output provides the total input energy to the absorption system during a thermal storage cycle.

The absorption system of this present method provides for storing at least portions of the separate strong solution and diluent liquid streams in first and second zones 40, 50, respectively, as shown in FIG. 1 against demand in a second evaporator phase containing evaporator and absorber functions where the liquid diluent is used for chilling a refrigeration heat exchanger 90 connected to process an external refrigeration medium for an air conditioning or refrigeration load, or the like. Heat transferred to the cold liquid diluent during the chilling step (evaporator function) will cause evaporation of some diluent which is thereby available for diluting a second stream of strong liquid solution (absorber function) removed from the first zone and introduced within the absorber phase, thereby producing a second liquid stream of diluted or weak solution at a rate dependent upon controlling the flow of the second liquid stream of strong solution from the first zone. The absorption cycle is closed by storing at least a portion of the second weak liquid solution stream in a third zone 70 and subsequently withdrawing the first liquid stream of relatively weak solution therefrom and introducing same to the first concentrator phase at a rate determined by the capacity of the concentrator phase, and only during intervals when replenishing the liquids stored in the first and second zones 40 and 50.

Storage of quantities of each of the relatively strong and weak liquid solutions and of the liquid diluent also allows for favorable operating conditions in each of the first, concentrating, and second, absorbing, phases. With the preferred aqueous lithium bromide solutions both concentrator and evaporator phases are preferably operated at substantially equivalent internal pressures of 0.2 inch mercury absolute (5.1 cm. mercury absolute) which provides for a water vapor saturation temperature (condensation temperature) of about 35° F. (1.7° C.) and relatively low solution boiling temperature; whereas the operating pressure normally found in prior absorption refrigeration concentrators which reject heat to the atmosphere, is in the range of 3 inch (76.2 cm.) mercury, absolute, resulting in water vapor saturation temperatures of about 115° F. (46.1° C.) and a weak solution boiling point of about 220° F. (104.4° C.).

Accordingly by maintaining the pressure within the concentrator phase at about 0.2 inch (5.1 cm.) mercury absolute, which is accomplished largely by regulating the heat input and flow of weak absorbent liquid into the first concentrator phase, the diluent vapor (e.g. water vapor) condenses when chilled to about 35° F. (1.7° C.) and the liquid diluent condensate may be delivered at that temperature to the second storage zone. Thus the liquid water diluent is also available at about 35° F. (1.7° C.) for use as a chilling medium in the evaporator phase where it may be applied to chill a refrigeration heat exchanger containing a fluid refrigeration medium from an air conditioner, or the like. The cold liquid diluent is introduced into the evaporator phase at a rate sufficient to meet the design demand of the refrigeration medium or load. It is often advantageous to apply and recirculate an excess of the cold liquid diluent to the refrigeration medium heat exchanger 90 to insure adequate wetting of the heat transfer surface. The heat from the refrigeration medium heat exchanger vaporizes a portion of the diluent; and that vapor is then available to be absorbed in the second liquid stream of warm concentrated absorbent solution which is injected into the absorber phase at a rate adequate to absorb the diluent vapor generated at the refrigeration heat exchanger. Additionally the injected absorbent solution and diluent vapor are preferably cooled a few degrees by a second heat exchanger 92 within the evaporator phase to remove the heat from the exothermic absorption process. The amount of cooling is regulated, along with the injection rate for concentrated absorbent solution, so as to maintain the pressure within the evaporator phase at an optimum level (0.2 inch mercury, absolute, in a preferred embodiment). Further, the resultant cool diluted and relatively weak liquid absorbent solution is withdrawn to the third storage zone 70 where it is held against demand in the concentrator phase. It is intended that the concentrator phase be operated at near optimum design capacity for periods of time that may or may not be coincident with the operating cycle of the absorber phase.

As illustrated in FIG. 1 heating of the first stream of relatively weak liquid absorbent solution within the first concentrator phase of an absorption system may be efficiently achieved by heat liberated from a condenser stage of an electric powered heat pump; and the resultant diluent vapor is condensed by the heat pump evaporator, thereby conserving the latent heat of condensation of the diluent and reinjecting it into the concentration process. That is, the concentrator phase chamber contains both the condenser 12 and evaporator 14 stage heat exchangers of a mechanical heat pump wherein the heat pump compressor 18, driven by a power means such as, an electric motor 20 or fuel fired engine, is conveniently located outside the concentrator chamber.

However, in a number of applications according to the present invention, it is preferred that the absorption refrigeration system supplement the cooling capacity of a mechanical expansion refrigeration system and provide a thermal storage reserve usable during periods of peak cooling demand to reduce the energy required by the mechanical system. In such applications, the mechanical system may be alternately connected to the absorber concentrator to both supply the thermal energy necessary for vaporizing diluent from the weak absorber solution and also condensing the diluent.

This is accompanied by substantially continuously operating the mechanical system and alternately first operating the absorber system evaporator phase and combining the cooling capacity of the mechanical gas expansion section with the cooling capacity of the evaporator section of the absorber system to chill a refrigeration medium during a chilling cycle (during which time the heat outputs of both the absorber and the mechanical compression heat extractor are combined to a heat ejector and the absorber produces quantities of weak absorber solution) and second operating the absorber system concentrator phase while connecting the cooling capacity of the mechanical gas expansion section to the condenser section and connecting the heat extractor of the mechanical system to the generator section of the absorption system to drive the concentrator phase to produce and store quantities of both strong absorbent solution and cold diluent.

A basic absorption and storage system of apparatus is schematically illustrated in FIG. 1 wherein a concentrator vessel 10, such as closed cylindrical tank, contains a heat pump circuit comprising a condenser coil 12 in a lower (generator) section of the vessel and an evaporator coil 14 in an upper (condenser) section of the vessel. The coils 12 and 14 are interconnected by a refrigerant expansion valve 16 and each coil is connected in the usual manner to a compressor 18 located outside the vessel. The compressor is driven by an electric motor 20. In some systems where the demands on the heat pump evaporator 14 and condenser 12 are not balanced, it may be advantageous to include an auxiliary exterior heat exchanger (not shown) outside the vessel 10. Usually where this is needed it will be connected between the compressor discharge and the condenser coil 12.

It will be seen in FIG. 1 that the concentrator vessel 10 also contains a first diluent collection pan 30, located directly beneath the evaporator coil 14, and a first absorbent solution spray header 32, located directly above the condenser coil 12. An absorbent solution sum 34 is located in the vessel 10 beneath the condenser coil 12. A first reservoir 40 is connected to the sump 34 of concentrator vessel 10 by a pipe 42, pump 44 and a check valve 46; and a second reservoir 50 is connected to the first diluent collection pan 30 by a pipe 52, pump 54 and a check valve 48.

The second reservoir 50 is also connected to a diluent spray header 56 through a variable flow control valve 58. The diluent spray header 56 is located within one (evaporator) section, usually an upper section, of an evaporator/absorber vessel 60. A second absorbent solution spray header 62 located in an adjacent, usually lower, (absorber) section of the vessel 60 is connected to the first reservoir 40 through another variable flow control valve 64. A second absorbent solution sump 66 is located in the evaporator/absorber vessel 60 beneath the second spray header 62 and is connected by pipe 68 to a third reservoir 70 which, in turn, is connected through a variable flow control valve 72 to the first absorber solution spray header 32. It will be seen that a pump 74 and a check valve 76 are connected in pipe 68 between the sump 66 and third reservoir 70. A second diluent collection pan 80 is positioned within evaporator/absorber vessel 60 below the diluent spray header 56 and is connected by a pipe 82 and pump 84 to recirculate diluent directly to the spray header 56.

Also it will be seen that two separate heat exchanger coils 90 and 92 are located within evaporator/absorber vessel 60. Heat exchanger coil 90 is located between the first diluent spray header 56 and collector pan 80 and circulates refrigeration medium from a cooling load such as an office air conditioning system, or the like (not shown). The heat exchanger 92 is positioned between the second absorber solution spray header 62 and the sump 66 and circulates fluid from a heat rejector such as a cooling tower (not shown).

First, second and third reservoirs 40, 50 and 70 respectively, have their outer shells vented to atmosphere (not shown in FIG. 1) in the valve and pump arrangement described. Alternately, they may be vented to the concentrator vessel or to the evaporator/absorber vessel, but they must be elevated above the vessel to which they feed liquid.

Operation of the foregoing system to service 100% of the cooling load under expected optimum conditions wherein the concentrator is designed to have approximately twice the absorber processing capacity of the evaporator, but to operate for only about one-half of the daily cycle when electric rates are lower, would involve the following characteristics. A relatively weak (dilute) absorbent solution of water and 57½% lithium bromide, stored in the third reservoir 70 at approximately 95° F. (35° C.), is sprayed into the concentrator vessel 10 at a rate to produce a stronger 63% solution at approximately 112° F. (44.4° C.) in the sump 34 which is continuously transferred to the first reservoir 40.

The vessel 10 is maintained at 0.2 inch (5.1 cm.) Hg. absolute and the heat pump compressor 18 and coils 12 and 14 are sized and operated to deliver superheated refrigerant gas at about 145° F. (62.8° C.) to the condenser coil 12, discharge refrigerant liquid at about 127° F. (52.8° C.) to the expansion valve 16 and to return refrigerant gas at about 30° F. (−1.1° C.) to the compressor inlet. Water vapor within the concentrator vessel will condense on the evaporator coil 14 and accumulate in the first collector pan 30 at about 35° F. (1.7° C.) from whence it is stored in the second reservoir 50 so as to be available on demand in the evaporator/absorber vessel 60.

By maintaining the evaporator vessel 60 at the same pressure of 0.2 inch (5.1 cm.) Hg. absolute the liquid water sprayed across the refrigeration heat exchanger 90 will remain at about 35° F. (1.7° C.) yet the available heat of vaporization will be adequate to chill refrigerant in the heat exchanger 90 from an inlet temperature of about 50° F. (10° C.) to an outlet temperature of about 40° F. (4.4° C.). The water vapor is reabsorbed in the strong lithium bromide solution drawn from the first reservoir 40 thereby diluting the solution to about 57½% which is then returned to the third reservoir 70. During reabsorption the solution is cooled by the rejection heat exchanger 92 to about 95° F. (35° C.) so as to maintain the vessel pressure at about 0.2 inch (5.1 cm.) Hg. Normally the rejection heat exchanger 92 may be sized so that 85° F. (29.4° C.) water from a cooling tower, or the like, is adequate to cool the diluted absorbent solution.

Obviously the foregoing system may be sized to meet a wide range of refrigeration loads. In relatively small applications of about five tons refrigeration or less, it will be possible to eliminate external reservoir vessels and to provide sufficient storage capacity for diluent and absorbent liquid solutions in the collector pans 30 and 80 and the sumps 34 and 66 within the respective concentrator and evaporator/absorber vessels 10 and 60, respectively. Each of the three separate reservoirs 40, 50 and 70 shown in the system of FIG. 1, when vented to the atmosphere, may be construed as shown in FIG. 2 to comprise an expandable bladder 100 within a rigid vessel 102 and separate inlet and outlet connectors 104, 106 and a vent 110. Atmosphere venting of the reservoir vessels provides a relatively constant pressure for feeding the control valves, and the bladders provide both a movable partition for fluid volume changes and means for preventing air and/or moisture absorption. It is also possible to combine the three reservoirs by utilizing three separate expandable bladders 100a, 100b and 100c within a single rigid vessel 108 as shown in FIG. 3. The combined reservoir volume will be approximately constant throughout operation of the described system and the total reservoir requirement will be about 1.2 cubic feet for each ton-hour of designed refrigeration capacity.

It is also feasible to modify the foregoing absorption refrigeration and storage system to service a portion of the cooling load, preferably about one-half of the load, in combination with a mechanical expansion refrigeration system. This is particularly advantageous in retrofit applications, such as those illustrated in FIGS. 4 and 5, devised to enhance existing mechanical refrigeration installations with an in-place refrigerant medium circuit. Additionally, a similar combination as shown in FIG. 6 is useful for new or initial installation. In each of the combined systems of FIGS. 4–6 the absorption system parts are identified by reference characters corresponding to those shown in FIG. 1.

In the combined system of FIG. 4 the inlet to the refrigeration medium heat exchanger coil 90 of evaporator vessel 60 is connected by a pipe 100 to a cooling load and the outlet thereof is connected by another pipe 102 to the inlet of medium cooling means or cooler 110 of a mechanical refrigeration system generally 108 having a centrifugal compressor 112. The outlet of the cooler 110 is connectable through a pump 116 and a two position valve 118 to a pipe 120 to the cooling load. (It is to be understood that for retrofit installations the in-place mechanical system 108 will include a cooler 110 that already cools a refrigerant medium, typically water, for circulation to the cooling load and that medium will be available to both phases of the absorption system.) Similarly, the inlet to the second heat exchanger coil 92 of the absorber section is connected by a pipe 122 to a heat ejector such as a spray tower; and the outlet of the heat exchanger coil 92 is connected by pipe 124 through a pump 126 and a two position valve 128 to the inlet of a heat extractor 130 of the mechanical system. In turn the heat extractor outlet is connected by a pipe 134 to the ejector (spray tower).

Thus it will be understood that during a cooling cycle with both the mechanical compressor 112 and the absorber-evaporator vessel 60 in operation the refrigeration medium from a cooling load will pass through pipe 100 into the refrigeration heat exchanger 90, where it will be cooled by cold diluent at about 35° F. and thence flow through pipe 102 to the mechanical chiller 110 where it will be further cooled and then returned by pump 116 through valve 118 and via pipe 120 to the cooling load. Simultaneously, the second heat exchanger coil 92 in the evaporator section of the absorber-evaporator vessel 60 receives cooling fluid through pipe 122 from a heat ejector (spray tower) and passes that fluid via pipe 124, valve 128 and pump 126 through the mechanical system heat extractor 130; and the heated fluid is returned to the heat ejector (spray tower) through pipe 134.

During a storage cycle, when the evaporator vessel 60 is inoperative, the refrigerant medium and heat ejector fluid circuits are blocked by repositioning valves 118 and 128 and chilled water from the mechanical system cooler 110 is circulated by pump 116 via valve 118 through pipes 140 and 142 through coil 14 of the condenser section in concentrator vessel 10; and the generator section coil 12 receives a circulation of hot fluid via pipes 148, 150 connecting a dedicated compressor 152. The heat output of the dedicated compressor 152 is boosted by warming the fluid circulated through pipe 150 after passing an expansion valve 154 with warm fluid such as water circulated through a heat exchanger 156 from the heat extractor 130, associated with the mechanical system centrifugal compressor 112, through pipes 158 and 160 and valve 128. By use of the dedicated compressor, the temperature of fluid to the coil 12 in the generator section can be raised to about 135° F. whereas the fluid available at the heat extractor 130 will typically be about 100° F.

It may be noted that, during a cooling cycle, when the two position valve 118 is positioned to direct flow through pipe 120 it will block flow in either direction through the closed circuit of pipes 140, 142 and coil 14. Conversely, during a storage cycle, when the valve 118 is positioned to direct flow into pipe 140 it will block in either direction through the closed circuit of the cooling load and pipes 120, 100, 102 and coil 90. Similarly when, during a cooling cycle, the two position valve 128 is positioned to permit flow from pipe 124 it serves to block flow in either direction through the circuit comprising pipes 158 and 160. Conversely, during a storage cycle, when valve 128 is positioned to direct flow through the pipes 158 and 160 it will block flow in either direction through the spray tower.

Referring to FIG. 5 a similar combined absorption and mechanical system is shown utilizing a reciprocating compressor 172. In the embodiment of FIG. 5 the piping connections between the evaporator vessel 60 and the mechanical refrigeration system generally 108' and operation during a cooling cycle are the same as the embodiment of FIG. 4 and parts common to the two embodiments bear the same reference characters. However, because the reciprocating compressor 172 is normally capable of rejecting heat through the heat extractor 130' at higher temperatures (typically about 140° F. as compared to about 104° F. for a centrifugal compressor) the generator section coil 12 of the absorber system concentrator vessel 10 is connected for direct circulation of hot water from the heat extractor 130' through pipes 178, 180 during the storage cycle and, as in the embodiment of FIG. 4, the condenser section coil 14 is connected by pipes 140', 142' to receive cold water circulated directly from the mechanical system chiller 110'.

Referring to FIG. 6 a combined absorber and mechanical system preferred for new or original installation is shown to include similar connections between the absorber system evaporator vessel 60 and the mechanical refrigeration system generally 108" and operation during a cooling cycle is substantially the same as in the embodiment of FIG. 4 and 5. However, in such an initial installation it is possible to provide for alternatively circulating the refrigerant gas from a reciprocating compressor 192 to a direct expansion cooler 194 during a cooling cycle and to the coils 12 and 14 of the absorber concentrator vessel 10 during a storage cycle. Thus the absorber system evaporator vessel 60 is connected to the cooler 194 and the heat extractor 130" of the mechanical system generally 108" similar to the embodiments of FIGS. 4 and 5 and functions in the same manner during a cooling cycle. During the storage cycle the connections between the mechanical system 108" and the concentrator vessel 10 and the operation thereof are substantially as with the embodiment of FIG. 1 with the mechanical system acting as a captive heat pump expanding gaseous refrigerant through the coil 14 of the condenser section and passing hot compressed fluid through the coil 12 of the generator section.

To accomplish this the reciprocating compressor 192 outlet is connected in parallel to two control valves 200, 202. Valve 200 leads directly to a heat extractor 130" and valve 202 leads to the heat extractor via conduits 212 and 214 and the condenser coil 12. Refrigerant liquid lines 204 and 216 lead from the heat extractor 130" and are equipped with solenoid valves 222 and 224, respectively. Valves 200 and 222 are opened and valves 202 and 224 are closed during the cooling cycle to circulate the compressed refrigerant fluid (gas) through the heat extractor 130" (where it is cooled and condensed by water directed through pipes 124" and 134" to a spray tower) and the resultant refrigerant liquid is directed thence through pipe 204 and thermostatic expansion valve 206 to the direct expansion cooler 194 where it is again vaporized and returned to the suction side of compressor 192 through a pipe 208. Thus the cooler 194 operates to cool refrigerant medium received from the absorber-evaporator vessel 60 through pipe 102" and circulate the medium to the cooling load via pipe 120".

During the storage cycle the valves 200 and 222 are closed (thereby making both the cooler 194 and the heat extractor 130" inoperative) and valves 202 and 224 are opened to direct the hot compressed fluid to circulate through conduit 212 and the coil 12 in the generator section of concentrator vessel 10 and thence through conduit 214 and the idle heat extractor 130" into conduit 216 and through a second thermostatic expansion valve 218 to the coil 14 in the condenser section of vessel 10. From the latter, the refrigerant gas is returned to the compressor 192 via a conduit 220.

In each of the embodiments of FIGS. 4–6 the concentrator vessel 10 functions during a storage cycle as in the embodiment of FIG. 1, to produce quantities of strong absorbent solution and a diluent which are stored in reservoir vessels 40, 50 against demand in the evaporator vessel 60 during a cooling cycle. Similarly during a cooling cycle quantities of a weak absorbent solution will be produced in the evaporator vessel 60 and stored in reservoir vessel 70. The total combined quantities of strong and weak absorbent solutions will be substantially constant and will run about 0.75–1.0 cubic feet per Ton-Hour of stored cooling capability. For a typical office building operating profile, this would amount to 3.0–5.0 cubic feet for each ton of design building cooling load. While it is possible to use the expandable bladder of FIG. 3 or to provide separate strong solution and weak solution fixed volume reservoirs sufficient to hold each maximum likely quantity, it is also possible to employ a plurality of interconnected portional reservoirs [not illustrated] to alternately serve to store first one of the absorbent solutions and then the other according to the cycle of operation.

Also, it is to be understood that the directions of circulation of the various medium, liquids and fluids, described for the embodiments of FIG. 4–6 are susceptible to modification although the described circulations are preferred in order to achieve optimum utilization of the temperatures available in the mechanical expansion refrigeration system and the absorbent refrigeration system as described.

Other modifications and variations of the aforedescribed invention may be made without departing from the spirit and scope of the invention which is defined in the following claims.

What is claimed is:

1. A method for combining absorption refrigeration and mechanical refrigeration systems to cool a refrigeration medium for circulation to a cooling load during a cooling cycle and to store cooling energy during a storage cycle, said method comprising:

operating the mechanical refrigeration system substantially continuously during alternate cooling and storage cycles; operating an absorbent system evaporator vessel during a cooling cycle to receive streams of cold diluent liquid and strong absorbent solution whereby to produce quantities of a weak absorbent solution and partially chilling a stream of refrigeration medium by passing the stream of refrigeration medium through a spray of said cold diluent liquid in said evaporator vessel; circulating said stream of refrigeration medium through a cooler section of the mechanical refrigeration system during said cooling cycle whereby to further chill said stream of refrigeration medium; receiving said quantities of weak absorbent solution in a storage zone during said cooling cycle; delivering a stream of weak absorbent solution from said storage zone during a storage cycle to an absorbent system concentrator vessel; operating said concentrator vessel during said storage cycle by heating the generator section thereof with heat extracted from said mechanical refrigeration system and cooling the condenser section thereof with fluid circulated through said mechanical refrigeration system whereby producing quantities of a strong absorbent solution and a cold liquid diluent; and storing said quantities of strong absorbent solutions and cold liquid diluent in respective storage zones until said evaporator vessel is operating during said cooling cycle.

2. The method of claim 1 including heating the said generator section with fluid circulated from a heat extractor of said mechanical refrigeration system.

3. The method of claim 1 including heating the said generator section with a compressed refrigerant gas that has been warmed by fluid circulated from a heat extractor with said mechanical refrigeration system.

4. The method of claim 1 including heating the said generator section and cooling the said condenser section with gas refrigerant circulated through the compressor of said mechanical refrigeration system.

5. The method of claim 1 including cooling the said condenser section by circulating there through refrigeration medium from said cooler section of said mechanical refrigeration system.

6. The method of claim 2 including cooling the said condenser section by circulating therethrough refrigeration medium from said cooler section of said mechanical refrigeration system.

7. The method of claim 3 including cooling the said condenser section by circulating therethrough refrigeration medium from said cooler section of said mechanical refrigeration system.

8. A combined refrigeration system including an absorption refrigeration system and a mechanical expansion refrigeration system to cool a refrigeration medium for circulation to a cooling load during a cooling cycle and to store cooling energy during a storage cycle, said combined system comprising:

a substantially continuously operating mechanical refrigeration system including compressor means, heat extractor means and cooling means;

an absorption refrigeration system including an evaporator vessel having an evaporator section and an absorber section and a concentrator vessel having a condenser section and a generator section;

a storage vessel connected to said evaporator vessel for receiving weak absorbent solution therefrom during said cooling cycle said storage vessel also connected to said concentrator vessel for delivering a stream of weak absorbent solution to said generator section during said storage cycle;

means for circulating a refrigeration medium through said evaporator section of said evaporator vessel and said cooling means of said mechanical refrigeration system during a cooling cycle;

means for introducing relatively hot fluid to said generator section of said concentrator vessel, said means being connected to receive heat from said mechanical refrigeration system whereby to produce quantities of a strong absorbent solution and diluent vapors;

means for circulating a relatively cold fluid from said mechanical system through said condenser section of said concentrator vessel during a storage cycle whereby to condense quantities of a cold diluent in said condenser section; and storage vessels connected to said concentrator vessel for storing said quantities of cold diluent and strong absorbent solution produced during said storage cycle, said storage vessels also connected to said evaporator vessel for delivering streams of said cold diluent and strong absorbent solutions during said cooling cycle.

9. The system of claim 8 wherein the means for introducing relatively hot fluid to said generator section of said concentrator vessel includes pipes connected to said heat extractor of said mechanical refrigeration system.

10. The system of claim 8 wherein the means for introducing relatively hot fluid to said generator section of said concentrator vessel includes a dedicated compressor and compressed gas circuit wherein the gas returning to said dedicated compressor is passed through a heat exchanger connected to said heat extractor of said mechanical refrigeration system.

11. The system of claim 8 wherein the means for introducing relatively hot fluid to said generator section of said concentrator vessel includes a compressed gas conduit from said compressor means and the means for circulating a relatively cold fluid through said condenser section includes a conduit and expansion valve returning said gas to said compressor means.

12. The system of claim 8 wherein the means for circulating relatively cold fluid from said mechanical system through said condenser section includes pipes connected to said cooling means.

13. The system of claim 9 wherein the means for circulation relatively cold fluid from said mechanical system through said condenser section includes pipes connected to said cooling means.

14. The system of claim 10 wherein the means for circulating relatively cold fluid from said mechanical system through said condenser section includes pipes connected to said cooling means.

* * * * *